United States Patent
Wan et al.

(10) Patent No.: US 6,990,074 B2
(45) Date of Patent: *Jan. 24, 2006

(54) METHOD AND APPARATUS FOR THE CONTROL OF MULTIMEDIA SERVICES IN NETWORKS

(75) Inventors: Guang Wan, Dallas, TX (US); Jonathan Weston-Dawkes, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 325 days.

This patent is subject to a terminal disclaimer.

(21) Appl. No.: 10/337,018

(22) Filed: Jan. 6, 2003

(65) Prior Publication Data

US 2003/0142625 A1 Jul. 31, 2003

Related U.S. Application Data

(63) Continuation of application No. 09/212,650, filed on Dec. 16, 1998, now Pat. No. 6,529,475.

(51) Int. Cl.
*G08C 25/00* (2006.01)

(52) U.S. Cl. ........................ 370/235; 370/231; 370/242; 370/248; 709/223

(58) Field of Classification Search ................ 370/229, 370/230, 230.1, 231, 232, 235, 252, 253, 370/241–245, 248, 401; 709/223, 235
See application file for complete search history.

(56) References Cited

U.S. PATENT DOCUMENTS

| | | | | | |
|---|---|---|---|---|---|
| 6,052,734 | A | * | 4/2000 | Ito et al. | 709/235 |
| 6,081,513 | A | * | 6/2000 | Roy | 370/260 |
| 6,091,709 | A | * | 7/2000 | Harrison et al. | 370/235 |
| 6,122,665 | A | * | 9/2000 | Bar et al. | 709/224 |
| 6,178,448 | B1 | * | 1/2001 | Gray et al. | 709/224 |
| 6,421,720 | B2 | * | 7/2002 | Fitzgerald | 709/224 |
| 6,529,475 | B1 | * | 3/2003 | Wan et al. | 370/231 |

* cited by examiner

*Primary Examiner*—Dang Ton
*Assistant Examiner*—Tri H. Phan
(74) *Attorney, Agent, or Firm*—R. Todd Morgan PLLC

(57) ABSTRACT

A method, apparatus, and system for reducing congestion of real time data traffic on a multimedia communications network having a traffic control mechanism. Information regarding congestion of the multimedia communications network is first extracted from data traffic in the multimedia communications network. This extraction is performed by a network of monitors. Congestion is regulated by a central server, which receives network information from the monitors and utilizes the network information to analyze congestion status and communicate instructions to the multimedia communications network to reduce congestion.

29 Claims, 3 Drawing Sheets

METHOD AND APPARATUS FOR THE CONTROL OF MULTIMEDIA SERVICES IN NETWORKS

RELATED PATENT APPLICATIONS

The present application is a continuation of U.S. patent application Ser. No.: 09/212,650, titled "Method for the Control of Multimedia Services in Networks," filed on Dec. 16, 1998, now U.S. Pat. No. 6,529,475.

BACKGROUND OF THE INVENTION

1. Technical Field

The present invention relates generally to a communications system and in particular to a method, apparatus, and system for improving flow of data traffic within a communications network. Still more particularly, the present invention relates to a method and system for improving flow of data traffic within a multimedia communications network by reducing congestion.

2. Description of the Related Art

The H.323 standard is an umbrella recommendation from the International Telecommunication Union (ITU) that sets standards for multimedia communications over Local Area Networks (LANs) that do not provide a guaranteed Quality of Service (QoS). These networks dominate today's corporate desktops and include packet-switched Transmission Control Protocol/Internet Protocol (TCP/IP) and Internet Packet Exchange (IPX) over Ethernet, Fast Ethernet and Token Ring network technologies. Therefore, the H.323 standard is an important building block for a broad new range of collaborative, LAN-based applications for multimedia communications.

The H.323 standard is the newest member of a family of ITU umbrella recommendations which cover video telephone multimedia communications over a variety of pipelines. The H.323 standard is in many senses a derivative of H.320, 1990 umbrella recommendation for video telephone over switched digital telephone networks. The H.323 standard borrows heavily from H.320's structure, modularity, and audio/video compression/ decompression (codec) recommendations.

The H.323 standard provides a foundation for audio, video, and data communications across IP based networks, including the Internet. By complying to the H.323 standard, multimedia products and applications, from multiple vendors can interoperate, allowing users to communicate without concern for compatibility. The H.323 standard will be the keystone for LAN based products for consumer, business, entertainment, and professional applications.

Communications under the H.323 standard can be considered a mix of audio, video, and control signals. Audio capabilities, Q.931 call setup, RAS control, and H.245 signaling are required. All other capabilities including video and data conferencing are optional. When multiple algorithms are possible, the algorithm utilized by the encoder are derived from information passed by the decoder during the H.245 capability exchange. H.323 terminals are also capable of asymmetric operation (different encode and decode algorithm) and can send/receive more than one video and audio channel.

The H.323 standard addresses call control, multimedia management, and bandwidth management for point-to-point and multipoint conferences. It is designed to run on common network architectures. As network technology evolves, and as bandwidth management techniques improve, H.323-based solutions will be able to take advantage of the enhanced capabilities. The H.323 standard is not tied to any hardware or operating system and H.323-compliant platforms will be available in all sizes and shapes, including video-enabled personal computers, dedicated platforms, and turnkey boxes.

Often, users want to conference without worrying about compatibility at the receiving point. The H.323 standard establishes standards for compression and decompression of audio and video data streams, ensuring that equipment from different vendors will have some area of common support. Besides ensuring the receiver can decompress the information, the H.323 standard establishes methods for receiving clients to communicate capabilities to the sender. The standard also establishes common call setup and control protocols.

The H.323 standard utilizes both reliable and unreliable is communications. Control signals and data require reliable transport because the signal must be received in the order in which they were sent and cannot be listed. Audio and video streams lose their value with time. If a packet is delayed, it may not have relevance to the end user. Audio and video signals utilize the more efficient but less reliable transport.

Because the H.323 standard is Real-Time Transport Protocol (RTP) based, it can operate on the Internet's Multicast Backbone (Mbone), a virtual network on top of the Internet that provides a multicast facility, and supports video, voice and data conferencing. The H.323 [H.323v2] standard has been proposed to perform call control (i.e. make connections) of real-time service on IP networks. The H.323 standard allows end-points or terminals wanting to make connections to negotiate bandwidth and coding requirements before the connection is established. In this standard there are three key players:

End-point: These are terminals which need to make connections. They request the connection through a gatekeeper (if one is on the network) and they also negotiate the connection parameters.

Gatekeeper: These entities perform bandwidth control (on LANs) and routing of connection packets towards the destination terminal.

Gateway: This entity can be thought of as a collection of end-points, but these entities also translate from other bearer protocols (such as time-division multiplexing (TDM)) to the IP protocol.

FIG. 1 clearly illustrates the interconnectivity of these components. FIG. 1 depicts a network with several gatekeepers 100, routers 101, endpoints 102, gateways 108, and terminals 104. Gatekeepers 100, routers 101, gateways 108, endpoints 102, and terminals 104 are interconnected via network links 106. Note that gatekeepers 100 are linked together to form the framework of the network while gateways 108, endpoints 102 and terminals 104 serve as the branches to this framework.

The Gatekeeper is a H.323 entity that provides address translation, control access, and sometimes bandwidth management to the LAN for H.323 terminals, Gateways, and Multipoint Control Units (MCUs). Gatekeepers perform two important call control functions which help preserve the integrity of the corporate data network. The first is address translation from LAN aliases for terminals and gateways to IPX addresses, as defined in the Registration/Admission/Status (RAS) specification. The second function is bandwidth management, which is also designated within RAS. For instance, if a network manager has specified a threshold for the number of simultaneous conferences on the LAN, the Gatekeeper can refuse to make any more connections once threshold is reached. The effect is to limit the total conferencing bandwidth to some fraction of the total available, the remaining capacity is left for e-mail, file transfers, and other LAN protocols. The collection of all Terminals, Gateways and Multipoint Control Units managed by a single gatekeeper is known as a H.323Zone.

Improvements in communications arise from changing user's needs and demands. Previously, public network needs were driven by telephoning and voice data. Data traffic has grown slowly until recently. With the lower cost in telecommunications and the higher increase in processing power of computers, the number of users accessing communications networks has increased. The needs of these users include, for example, video telephone, low cost video conferencing, imaging, high definition television (HDTV), and other applications requiring multimedia data transfers. Multimedia combines different forms of media in the communication of information between a user and a data processing system, such as a personal computer. A multimedia application is an application that utilizes different forms of communications within a single application. Multimedia applications may, for example, communicate data to a user on a computer via audio, text, and video simultaneously. Such multimedia applications are usually bit intensive, real time, and very demanding on communications networks.

The H.323 standard sets multimedia standards for the existing infrastructure (i.e. IP-based networks). Design to compensate for the effect of highly variable LAN latency, the H.323 standard allows customers to utilize multimedia applications without changing their network infrastructure.

Reliable transmission of messages utilizes a connection-oriented mode for data transmission. Reliable transmission guarantees sequenced error-free, flow-controlled transmission of packets, but can delay transmission and reduce throughput. The H.323 standard utilizes reliable (TCP) end-to-end service for the H.245 Control Channel, the T.120 Data Channel and the Call Signaling Channel.

Within the IP stack, unreliable services are provided by User Datagram Protocol (UDP). Unreliable transmission is a mode without connection with promises nothing more than "best effort" delivery. UDP offers minimal control information. It is a network layer which sits at the same level of network stack as TCP. It is a connection-less protocol within TCP/IP that corresponds to the transport layer in the ISO/OSI model. UDP converts data messages generated by an application into packets to be sent via IP but does not verify that messages have been delivered correctly. The H.323 standard utilizes UDP for the audio, video and the RAS Channel.

IP networks are the technology driving the Internet. The rise of these networks is primarily due to their acceptance as the layer 3 protocol in the enterprise networks. Most PCs now utilize transmission control protocol/Internet protocol (TCP/IP) as their networking protocol. IP has even gained acceptance as the wide area protocol since it is about 25–30% more efficient than ATM.

The kinds of traffic running over IP networks are of two major types:
  Elastic traffic or non-real-traffic which is primarily data file transfer. Most of this traffic uses TCP as its transport level protocol and it can withstand delay quite well, but any corruption of data must be retransmitted; and
  The inelastic or real-time traffic is interactive voice, video or data-conferencing. This kind of traffic does not withstand delay well since late information in an interactive session is of no use. This kind of traffic utilizes real time protocol (RTP) over UDP as the transport protocol.

UDP is the dominant multimedia protocol. However, it does not have any inherent congestion control mechanism. A need thus exists for Real-Time Transport Control Protocol (RTCP) protocol on top of UDP to control delays. RTCP works with RTP for multimedia services.

Running real-time traffic over IP network has other significant problems also. Currently, there is no way of reserving bandwidth end-to-end in an IP network. Each IP packet takes its own route through the network. Therefore, each packet gets to its destination (in theory) through a different route and can have a different delay in getting to its destination. This causes delay variance or jitter at the destination where the packets have to be "played" for the destination user.

There have been some concerns in voice-over-IP (VoIP) industry that the introduction of large volume voice traffic into an IP network will unfairly compete for network bandwidth with existing TCP traffic. TCP has congestion control mechanisms built in. Once TCP senses network congestion by its detection of lost packets, it will reduce its packet transmission rate. Therefore, in case of network congestion, all TCP connections will throttle back until the congestion is relieved. However, UDP does not have similar control mechanisms. For now, UDP traffic in IP networks has been minimal. Although only TCP traffic reacts to network congestion, it has not been a problem. It is expected that the introduction of VoIP services will bring in a large volume of UPD traffic. Voice UDP traffic is an ill-behaved source and can potentially lock out TCP traffic in case of congestion. Since other multi-media services, such as video conferencing, are also expected to use UDP as the transport layer protocol, this problem exits for all IP multi-media services. Data applications currently use and will continue to use reliable transmission protocols (i.e. TCP) because data integrity is the top priority. The perceived UDP traffic increase will come from IP multimedia applications. Some congestion control mechanism is required to manage multimedia UDP traffic.

Therefore, it would be desirable to have an improved method and apparatus for reducing congestion in the flow of data traffic in a multimedia communications network. Additionally, it would be desirable to reduce such congestion flow without significant interruption in the flow of data within the multimedia communications network.

SUMMARY OF THE INVENTION

It is one object of the present invention to provide an improved method and system for a communications system.

It is another object of the present invention to provide an improved method and system for improving flow of data traffic within a communications network.

It is yet another object of the present invention to provide an improved method and system for improving flow of data traffice within a multimedia communications network by reducing congestion.

The above features are achieved as follows. A method is disclosed for reducing congestion of real time data traffic on a multimedia communications network having a traffic control mechanism. The method comprises first extracting from data traffic in the multimedia communications network information regarding congestion of the multimedia communications network. Secondly, congestion is regulated on the multimedia communications network utilizing the network information extracted from the multimedia communications network.

In accordance with a preferred embodiment of the present invention, a plurality of monitors scans the through data traffic for RTCP packets. The RTCP packets provide information on the traffic flow which is extracted by the monitors. The information is forwarded to a central server where it is analyzed. Following this analysis, the central server initiates steps to relieve congestion in the network.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
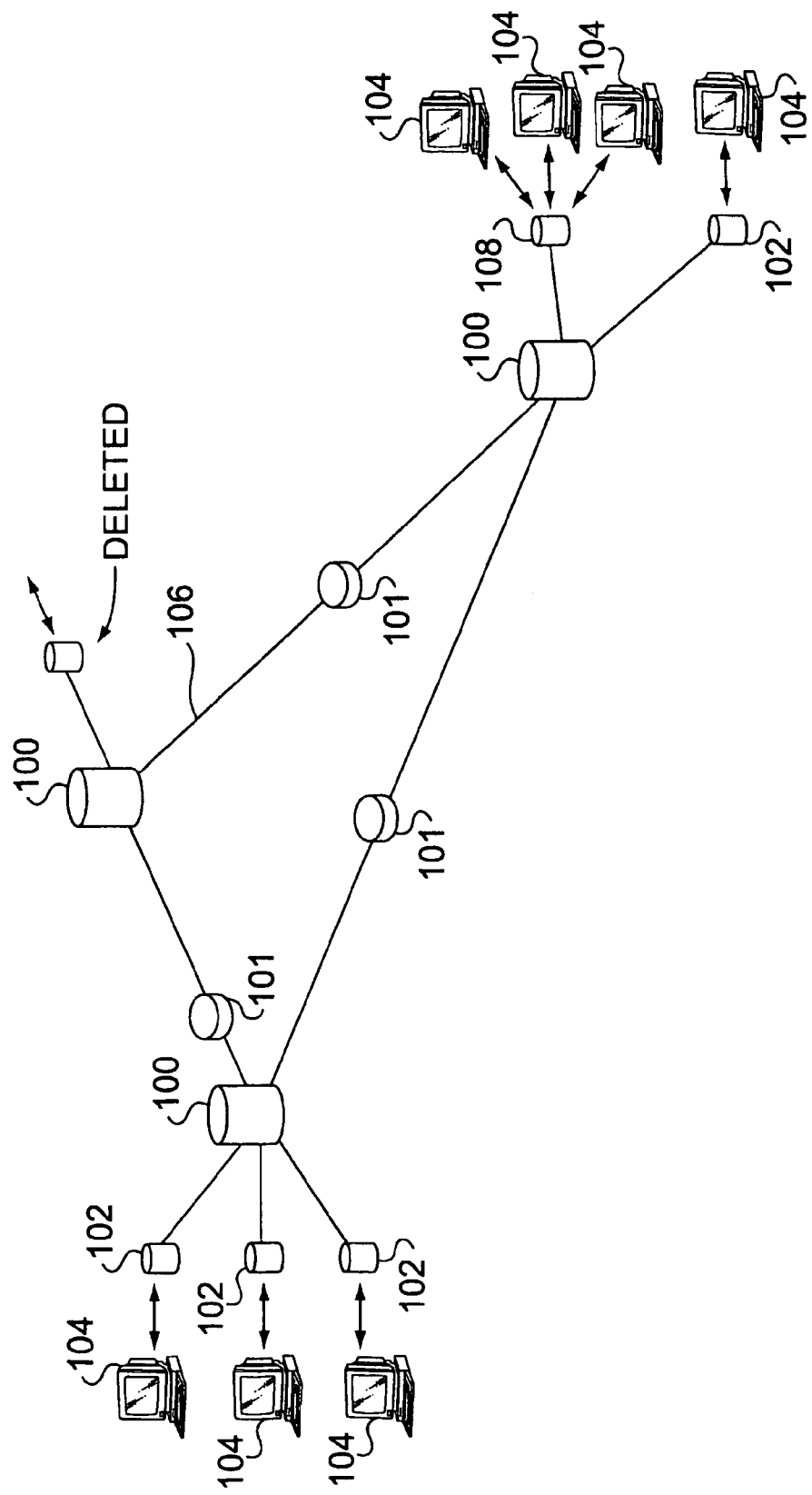
FIG. 1 is a diagram depicting a representation of physical network of a communications system according to one embodiment of the present invention.

With reference now to the Figures, the preferred embodiment of the present invention is depicted. The invention discloses a way to monitor congestion of data traffic on a multimedia network. While the preferred embodiment of the invention described herein is implemented within a H.323 network, it is understood by those skilled in the art that the invention can be practiced in any network containing the RTCP protocol or any other protocol with similar functionality.

Video and audio traffic is bandwidth intensive and could clog the corporate network. The H.323 standard addresses this issue by providing bandwidth management. Network managers can limit the number of simultaneous H.323 connections within their network or limit the amount of bandwidth available to H.323 applications. These limits ensure that critical traffic will not be disrupted.

In RTP protocol, a header containing a time stamp and a sequence number is added to each UDP packet. With appropriate buffering at the receiving station, timing and sequence information allows the application to eliminate duplicate packets, reorder out of sequence packets, synchronize sound, video and data, and accept continuous playback in spite of varying latencies.

The Real Time Control Protocol (RTCP) is utilized for the control of RTP. RTCP monitors the quality of service, conveys information about the session participants, and periodically distributes control packets containing quality information to all session participants through the same distribution mechanisms as the data packets.

The network protocol stack for multi-media services specified in the H.323 standard is one that puts application traffic on top of RTP/RTCP, then on top of UDP/IP. Within this protocol stack, RTCP does provide feedback information on the quality of the data distribution. RTCP is a scalable protocol that provides sufficient network delay, packet loss, throughput information, etc. In the present invention, the RTCP information is utilized to build congestion control mechanism for multi-media UDP traffic and multi-media traffic in general because RTP/RTCP is used for all multi-media traffic.

According to the H.323 standard, voice traffic (video traffic as well) is transmitted on top of RTP/RTCP. The real-time transport protocol (RTP) provides end-to-end delivery services for data with real-time characteristics, such as interactive audio and video. These services include payload type identification, sequence numbering, time-stamping and delivery monitoring. The RTP control protocol (RTCP) is based on the periodic transmission of control packets to all participants in the session. It provides feedback on the quality of the data distribution, carries a persistent transport-level identifier for RTP sources, and controls the RTCP packet rate to scale up to a large number of participants. RTCP also dynamically keeps track of the number of participants in a session and guarantees the control traffic is limited to a small fraction of the session bandwidth (suggested at 5%).

RTCP information is not only useful for the sender and receiver but also can be utilized by third-party-monitors. Such monitors (congestion monitors) process only the RTCP control packets and not the corresponding RTP data packets to evaluate the performance of networks. Congestion monitors can be deployed to monitor RTCP messages (possibly some ICMP messages as well, such as the source quench message) and derive congestion information about the network. Such information is utilized by the call control servers, gatekeepers, in the network to control the network congestion and provide QoS guarantees.

The present invention provides a congestion control mechanism for IP multi-media services based on H.323 networks and other networks which contain the RTCP protocol or protocols with similar functionality. Basically, congestion monitors are utilized to monitor RTCP information generated by H.323 sessions and communicate with a central congestion server to calculate the network congestion status. In the preferred embodiment, the congestion monitors are specialized stand-alone boxes that can tap into a router or switch to monitor RTCP traffic. In another embodiment of the invention, the congestion monitor is integrated within the IP routers. Its primary functionality is to scan RTCP packets within the traffic stream, extract performance information from the packets, and summarize them on session basis. Some simple performance statistics can be calculated at the monitors. Call admission control logic is implemented at network call control centers, gatekeepers, to control network congestion.

The congestion monitors are specialized because they can look only at RTCP packets. Unlike routers, for example, which look at and processes all the data packets, congestion monitors can differentiate the packets and scan only the RTCP packets within the data traffic. These RTCP packets represent a small percentage of the overall data traffic. The congestion monitor may be hardware implemented. Due to its need to react to the high speed of data traffic, congestion monitors themselves are required to have very high processing speed. The congestion monitors performs only basic processing of the packets to collect basic statistical information; therefore they do not have to be very complex (little intelligence).

The appropriate usage of congestion monitors can reduce the delay variance and packet drop rate of IP packets and, thus, improve Quality of Service (QoS) for multi-media IP services. There are two possible approaches to implement control over network congestion. These are call admission control and bandwidth reduction.

Call admission control is probably the more effective approach for voice over IP services. It is also very effective for other type of services. In the preferred embodiment, call admission control (i.e., rejecting new calls) is implemented at network call control centers, gatekeepers, to control network congestion. Whenever the centralized congestion server detects congestion in the network, it will inform the relevant gatekeepers in the network. If the congestion is global, all gatekeepers will be informed. If it is local to certain part of the network, only gatekeepers controlling that part of the network will be informed in the preferred embodiment. Upon such notification, gatekeepers will adjust its call admission policies according to certain predefined rules. Under these rules in the preferred embodiment, it is tougher for a new call to be admitted the more congested the network is. Also, the rules provide fairness among users and enforce service priority if required. Since the central congestion server utilizes real time RTCP information generated by RTP connections, the scheme can provide responsive and timely control over voice multi-media UDP traffic in a IP network.

Bandwidth reduction is the second approach to controlling the network congestion. Unlike data applications, which are delay insensitive, multi-media applications require certain constrains on end-to-end data delivery. Therefore, the schemes utilized in TCP protocol may introduce unconstrained delay. Bandwidth reduction can not be achieved by increasing transmission time and, consequently, reducing the transmission rate. Instead the amount of data that needs transmission should be reduced for multi-media services in case of network congestion. For video, bandwidth reduction can be achieved by adjusting window size, frame rate, video quality, color coding schemes, etc. In voice-only connections, such bandwidth reduction options are limited. For example, the lowest coding rate for VoIP is 5.3 kbps which, including all the header overhead, has an effective rate of only 16 kbps. There are ways to reduce it further, such as silence compression and header compression.

Normally, applications can detect congestion by RTCP information they receive and are expected to take certain actions to reduce its data rate in case of congestion. However, it is possible that even though some connections do not see obvious congestion signals, the overall network is congested. In order to effectively control the congestion, the network may want to make these applications reduce their data rate as well. There are two possible ways of doing it. In the preferred embodiment, the gatekeepers inform these applications directly. The other embodiment allows the congestion monitors to alter the content of RTCP packets to "fool" the source applications into congestion detection and bandwidth reduction.

In the preferred embodiment, the balance between the TCP congestion control schemes and the proposed RTCP based control scheme is a critical issue. Fairness needs to be preserved between the two schemes according to service priority and bandwidth availability. Neither scheme takes away an unfair amount of bandwidth at the same priority level from the other when congestion happens. Since the TCP schemes are well standardized whereas RTCP does not specify how to act on the congestion, RTCP schemes are tuned to react in a manner comparable to TCP under congestion in the preferred embodiment.

The central servers are high capacity computers which take multiple connections and can perform network management/configurations. Most of the functionality of the server is completed utilizing software algorithms. In one embodiment of the invention, these central servers exist as independent units from the network and send/relay messages to the gatekeepers to control congestion. In another embodiment of the invention, the gatekeepers themselves serve as the central servers. This embodiment is possible since gatekeepers are software driven. The required functionality of the central server can be programmed into the gatekeepers (i.e. the software modified) to enable them to manage the flow of data traffic based on the information received form the monitors.

Application Specific Integrated Circuits (ASIC) technology can be utilized to implement the functionality to complete the task in realtime. Some simple performance statistics can be calculated at the congestion monitors, then, statistics from the sessions that are reporting performance problems will be sent to a centralized server to compile the overall picture about the network congestion status. RTCP packets provide sufficient information to derive statistics such as the packet loss rate, average payload size, connection throughput, and determine whether problems are local, regional or global. Because the required functionality is limited and RTCP traffic is low volume in nature, such a monitor does not need to be a high-capacity product. Therefore, the implementation is relatively easy and inexpensive.

Figure 2:
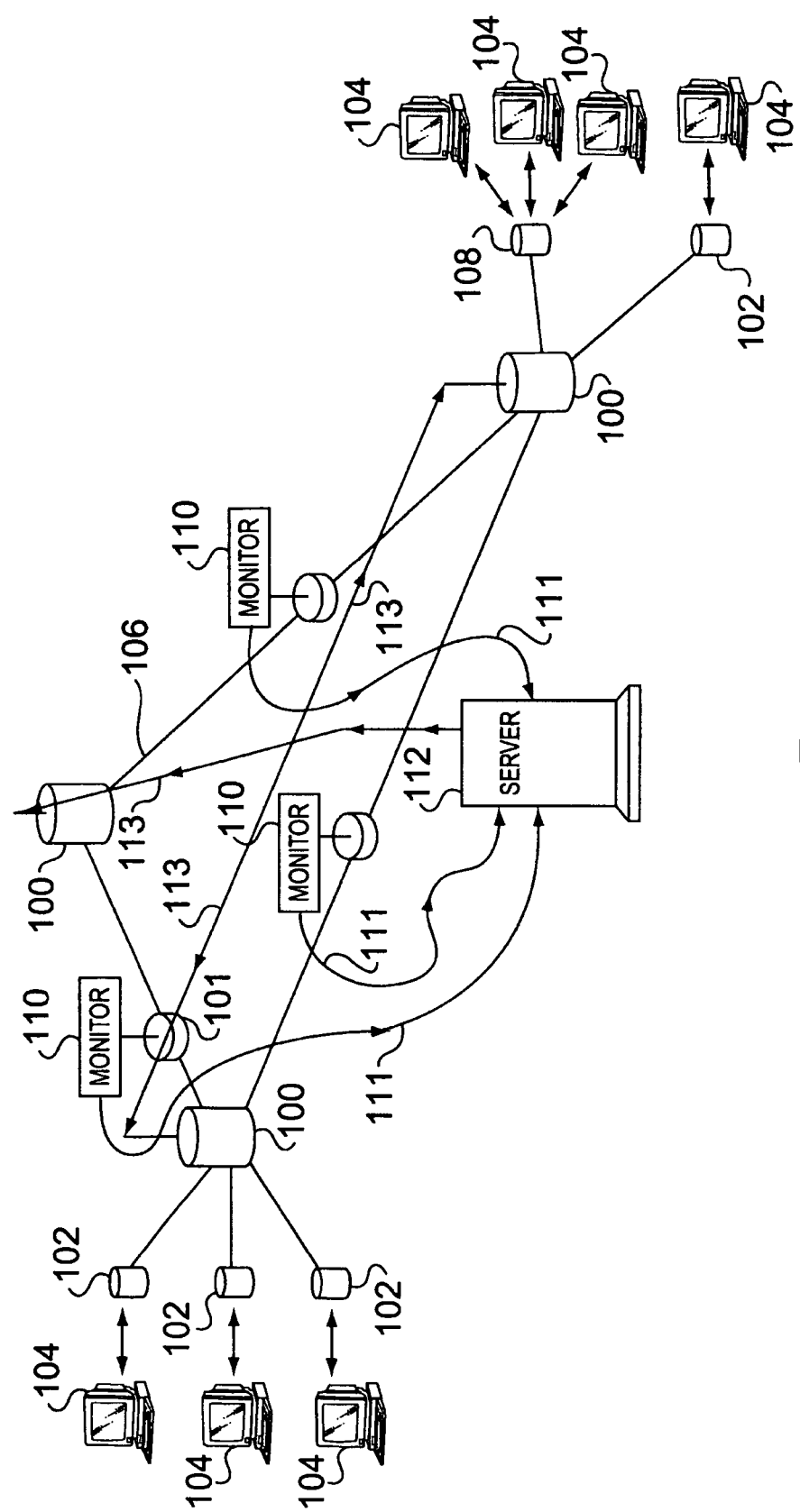
FIG. 2 is a diagram of a communications system with attached congestion monitors according to one illustration of the present invention.

With reference now to the figures, and in particular FIG. 2, the present invention may be implemented with the basic communications network as shown. FIG. 2 depicts the preferred embodiment of the present invention. The main elements of the present invention are shown overlaying the network of FIG. 1. The network as described above consist of gatekeepers 100, routers 101, gateways 108, endpoints 102, and terminals 104 interconnected via network links 106. Connected to routers 101, are monitors 110 which remove the RTCP packets from the network. These monitors send the information received from the RTCP packets to central server 112 via some transport/connection means 111 such as a bus link or other communication channel. Central server 112 is in turn connected to the network's gatekeepers 100 via server connections 113. Note that in this preferred embodiment, central server operates separately from gatekeepers.

Figure 3:
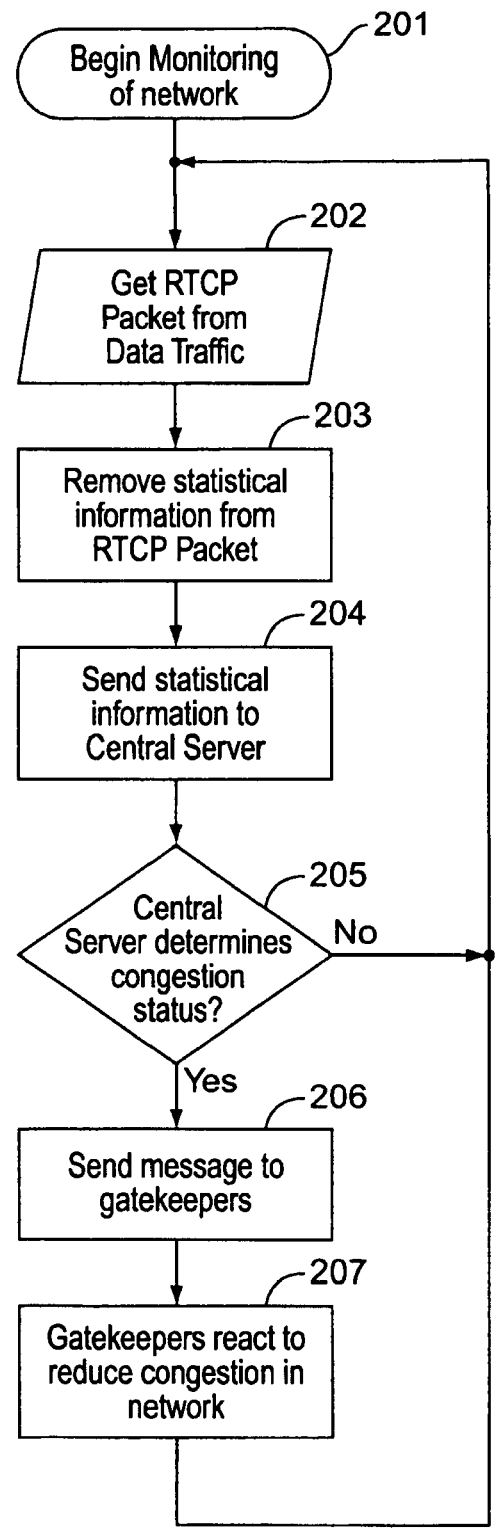
FIG. 3 is a flow chart depicting the logic flow of the process for relieving congestion in the communications system according to one embodiment of the present invention.

Turning now to FIG. 3, there is depicted one embodiment of the logic flow of the process for reducing congestion in the network. The process begins when the congestion monitors are connected to and begin to monitor the network as illustrated in block 201. The congestion monitors look at RTCP packets within the data traffic as shown in block 202. Once this is done, the RTCP packets are analyzed in real time and statistical information regarding the congestion status of the network are collected as depicted in block 203. Periodically, the congestion monitors forward the information to the central server as shown in block 204. Central server utilizes this information to determine the congestion status of the network as shown in block 205. If the network is not congested, the process is restarted with the next batch of RTCP packets. If however, the network is congested, the central server sends a signal to the gatekeepers as illustrated in block 206. Once this signal is sent, the gatekeepers react to reduce congestion in the network as shown in block 207. This process is then repeated for the next set of RTCP packets.

The description of the preferred embodiment of the present invention has been presented for purposes of illustration and description, but is not intended to be exhaustive or limit the invention in the form disclosed. For example, although central servers are depicted as separate components from the gatekeepers, it is understood that the functionality of the central servers may be incorporated into existing gatekeepers. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of reducing congestion of real time data traffic on a multimedia communications network having a plurality of gatekeepers, said method comprising:

extracting, from specialized packets within data traffic in said multimedia communications network, information regarding congestion of said multimedia communications network, wherein said extracting step is completed by a plurality of monitors coupled to said multimedia communications network that are designed to recognize and intercept said specialized packets;

analyzing said information extracted from each of said plurality of monitors with a centralized processing component coupled to said plurality of monitors;

regulating congestion on said multimedia communications network utilizing the analyzed information whereby said centralized processing component is utilized to control data traffic by messaging said plurality of gatekeepers and dynamically adjusting call admission policies of said gatekeepers to which said control message is sent wherein said call admissions policies are adjusted based on pre-determined rules upon receipt of said control message.

2. The method of claim 1, wherein said analyzing step analyzes an aggregate of all received congestion information against known quality of service and transmission parameters of said network.

3. The method of claim 1, wherein said specialized data packets are members of a scalable protocol that provides network traffic information, including at least one of: sufficient network delay information, packet loss information, and throughput information.

4. The method of claim 3, wherein said scalable protocol provides feedback on quality of data distribution.

5. The method of claim 3, wherein said scalable protocol carries a persistent transport level identifier.

6. The method of claim 3, wherein said scalable protocol dynamically tracks the number of participants in a session and controls a real-time packet rate to scale for different numbers of participants.

7. The method of claim 3, wherein said scalable protocol is the Real Time Control Protocol (RTCP) and said specialized packets are RTCP packets.

8. A system for reducing congestion of real time data traffic on a multimedia communications network having a traffic control mechanism, said system comprising:

means for extracting, from specialized packets within data traffic in said multimedia communications network, information regarding congestion of said multimedia communications network, wherein said extracting step is completed by a plurality of monitors coupled to said multimedia communications network that are designed to recognize and intercept said specialized packets, wherein said plurality of monitors are standalone congestion monitors that differentiate said specialized packets from standard data packets within network traffic and said congestion monitors are designed to retrieve only said specialized packets from said network traffic;

means for analyzing said information extracted from each of said plurality of monitors with a centralized processing component coupled to said plurality of monitors;

means for regulating congestion on said multimedia communications network utilizing the analyzed information whereby said centralized processing component is utilized to control data traffic by messaging a plurality of gatekeepers, and when a reduction in data rate is desired from a transmitting application, altering, via said plurality of monitors, a content of said specialized packets to force congestion detection and subsequent bandwidth reduction for said transmitting application.

9. The system of claim 8, wherein said means for analyzing further comprises means for aggregating and comparing received congestion information against known quality of service and transmission parameters of said network.

10. The system of claim 8, wherein said specialized data packets are members of a scalable protocol that provides network traffic information, including at least one of: sufficient network delay information, packet loss information, and throughput information.

11. The system of claim 10, wherein said scalable protocol provides feedback on quality of data distribution.

12. The system of claim 10, wherein said scalable protocol carries a persistent transport level identifier.

13. The system of claim 10, wherein said scalable protocol dynamically tracks the number of participants in a session and controls a real-time packet rate to scale for different numbers of participants.

14. The system of claim 10, wherein said scalable protocol is the Real Time Control Protocol (RTCP) and said specialized packets are RTCP packets.

15. A system for reducing congestion of real time data traffic on a multimedia communications network having a traffic control mechanism, said system comprising:

means for extracting, from specialized packets within data traffic in said multimedia communications network, information regarding congestion of said multimedia communications network, wherein said extracting step is completed by a plurality of monitors coupled to said multimedia communications network that are designed to recognize and intercept said specialized packets;

means for analyzing said information extracted from each of said plurality of monitors with a centralized processing component coupled to said plurality of monitors; and means for regulating congestion on said multimedia communications network utilizing the analyzed information whereby said centralized processing component is utilized to control data traffic by messaging said plurality of gatekeepers; and means for dynamically adjusting call admission policies of said gatekeepers to which said control message is sent wherein said call admissions policies are adjusted based on predetermined rules upon receipt of said control message.

16. The apparatus of claim 15, wherein said means for analyzing further comprises means for aggregating and comparing received congestion information against known quality of service and transmission parameters of said network.

17. The apparatus of claim 15, wherein said specialized data packets are members of a scalable protocol that provides network traffic information, including at least one of: sufficient network delay information, packet loss information, and throughput information.

18. The apparatus of claim 17, wherein said scalable protocol provides feedback on quality of data distribution.

19. The apparatus of claim 17, wherein said scalable protocol carries a persistent transport level identifier.

20. The apparatus of claim 17, wherein said scalable protocol dynamically tracks the number of participants in a session and controls a real-time packet rate to scale for different numbers of participants.

21. The method of claim 17, wherein said scalable protocol is the Real Time Control Protocol (RTCP) and said specialized packets are RTCP packets.

22. An apparatus for reducing congestion of real time data traffic on a multimedia communications network having a traffic control mechanism, said apparatus comprising:

means for analyzing congestion information extracted from specialized packets within data traffic in said network, wherein said specialized packets are intercepted and retrieved by each of a plurality of monitors that are coupled to a centralized processing component and are designed to recognize and intercept said specialized packets;

means for regulating congestion on said multimedia communications network utilizing the analyzed information to control data traffic by messaging a selected set among a plurality of gatekeepers; and means for dynamically adjusting call admission policies of said gatekeepers to which said control message is sent wherein said call admissions policies are adjusted based on predetermined rules upon receipt of said control message.

23. The apparatus of claim 22, wherein said means for analyzing further comprises means for aggregating and comparing received congestion information against known quality of service and transmission parameters of said network.

24. The apparatus of claim 22, wherein said specialized data packets are members of a scalable protocol that provides network traffic information, including at least one of: sufficient network delay information, packet loss information, and throughput information.

25. The apparatus of claim 24, wherein said scalable protocol provides feedback on quality of data distribution.

26. The apparatus of claim 24, wherein said scalable protocol carries a persistent transport level identifier.

27. The apparatus of claim 24, wherein said scalable protocol dynamically tracks the number of participants in a session and controls a real-time packet rate to scale for different numbers of participants.

28. The method of claim 24, wherein said scalable protocol is the Real Time Control Protocol (RTCP) and said specialized packets are RTCP packets.

29. An apparatus for reducing congestion of real time data traffic on a multimedia communications network having a traffic control mechanism, said apparatus comprising:

means for analyzing congestion information extracted from specialized packets within data traffic in said network, wherein said specialized packets are intercepted and retrieved by each of a plurality of monitors that are coupled to a centralized processing component and are designed to recognize and intercept said specialized packets;

means for regulating congestion on said multimedia communications network utilizing the analyzed information to control data traffic by messaging a selected set among a plurality of gatekeepers; and means, when a reduction in data rate is desired from a transmitting application, for altering, via said plurality of monitors, a content of Real Time Control Protocol (RTCP) packets to force congestion detection and subsequent bandwidth reduction for said transmitting application.

* * * * *